March 31, 1959     C. BOTTASSO     2,879,825
DIVIDED RIM ASSEMBLIES FOR TUBELESS TIRES Filed Feb. 8, 1956

INVENTOR
*Carlo Bottasso*

BY *Stevens, Davis, Miller and Mosher*
ATTORNEYS

United States Patent Office 2,879,825
Patented Mar. 31, 1959

2,879,825

DIVIDED RIM ASSEMBLIES FOR TUBELESS TIRES

Carlo Bottasso, Milan, Italy, assignor to Pirelli S.p.A., Milan, Italy

Application February 8, 1956, Serial No. 564,305

Claims priority, application Italy February 16, 1955

17 Claims. (Cl. 152—404)

The present invention relates to divided vehicle wheels suitable for tubeless tires and more particularly to employing a novel annular reinforced gasket in cooperation with a divided wheel to adapt same for use with a tubeless tire.

The use of a pneumatic tire made in a convenient manner in order to be employed without an inner tube, that is apt to constitute with the rim of a vehicle wheel an assembly capable of assuring a perfect air tightness, is well known.

Particular types of rims of special design to accommodate tubeless tires have likewise already been proposed.

On the contrary, it is proposed by the present invention to make conventional rims, of the so-called two-piece divided type, able to assure the requisite air tightness, thus allowing their employment also with tubeless tires.

The present invention refers particularly to that class of rims which are constituted of two separate metallic parts tightened or fastened together with bolts, as for instance those which are today in use for motorscooters.

It is a principal object of this invention to provide a special gasket, which cooperates with the rim as above defined to assure the requisite air tightness between the two metallic parts of the prescribed rim.

It is a further object of this invention to characterize the gasket with transverse projections which have the purpose of spacing the beads, in the case that during the running of the vehicle, for any reason, a tire deflation may happen. Consequently, by this means, there is avoided the danger of lateral skidding of the vehicle.

Other and further objects of the invention will become more fully apparent as the following detailed description progresses when taken in conjunction with the drawings in which:

Figure 3 shows diagrammatically the relationship of the gasket to the rim;

Figure 4 shows diagrammatically the gasket compressed between the adjacent parts of the rim, that is to say in service;

Figure 5 shows in cross section a particular embodiment of the invention, wherein the gasket is provided with transverse projections; and Figure 6 shows diagrammatically in perspective view the gasket provided with transverse projections.

Figure 1:
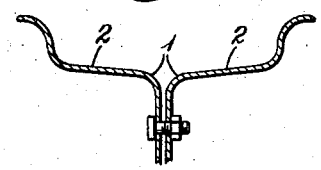
Figure 1 is a diagrammatic view in section showing the type of rim to which the present invention applies.

When the two metallic parts of a two-piece divided rim, of the type to which the invention refers, are bolted or assembled together, there remains between the contacting surfaces a space of slight thickness in form of circular crown. The surfaces defining the crown are indicated by the numeral 1 in Figure 1 and are formed by bends which are turned into surfaces 2 of the rim upon which tire beads are destined to be lodged. In order to prevent escape or leakage of air in the zone of the circular crown or at the connection between the two pieces of the rim, there is provided a novel annular gasket which cooperates with the two pieces of the rim in the vicinity of their connection to seal this area against escape or leakage of air. This gasket is constituted of the union of two parts, which are characterized in that one is made of an elastic material such as of a rubber compound and the other is made of a substantially inextensible material. The two parts of the gasket are arranged so that a certain quantity of the elastic material forming one part, when in working conditions, is compressed between the metallic parts of the rim at the interstice between the metallic parts and in the zone where the tightness or sealing is desired.

The part of the gasket made of substantially inextensible material has the aim to cooperate with the elastic part compressed between the rim parts to prevent the displacement of said elastic part in a radial direction towards the outside or out of the space between the rim parts. It will be appreciated that the inner diameter of the gasket is less than the diameter of the rim parts at their point of connection. This is illustrated in Figure 3. By this means the inner portion of the elastic part of the gasket lies between the rim parts and can be gripped by the rim parts during their connection.

Figure 2:
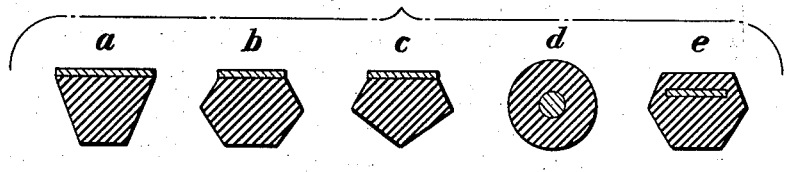
Figure 2 illustrates in cross section various embodiments of the gasket.
Figure 2:
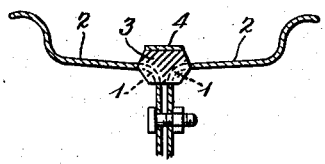
Figure 2:
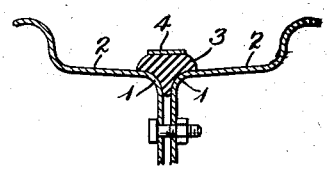
Figure 2:
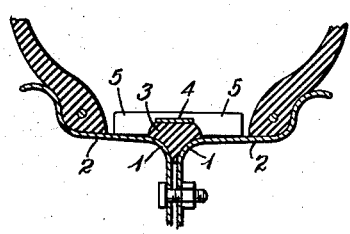
Figure 2:
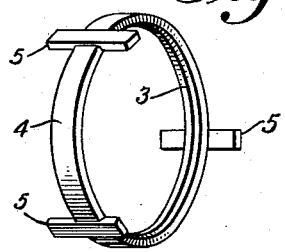

It will be understood that the gasket can be of various shapes without departing from the concepts of the invention; for instance the elastic part can have a regular or irregular polygonal shape, or a circular shape and the substantially inextensible part can be situated externally or internally of the elastic part; in Figures 2a, 2b, 2c, 2d, 2e some embodiments of the invention are shown by way of example, and on enlarged scale, in which the elastic part has a cross section, respectively, trapezoidal, hexagonal, pentagonal and circular and the substantially inextensible part is situated externally in Figures 2a, 2b, 2c, and internally in Figures 2d and 2e.

The substantially inextensible part is made integral with the elastic part during the curing of the latter; said inextensible part may be constituted of metallic material in the form, for instance, of a strap, wires, or rings lying side by side, or otherwise assembled, or it may be constituted of natural, artificial or synthetic textile materials, previously rubberized.

In Figure 3, a preferred embodiment of the invention is diagrammatically shown in which the gasket is constituted of an elastic body 3 hexagonal in section and surrounded by a metallic strap 4 which is bonded to the surface of the elastic body 3.

When the reinforced gasket is interposed between the two rim parts and the bolts are successively associated with their respective nuts so that the rim is in working condition, the inner portion of the elastic body 3 is compelled or compressed into the space or interstice formed by the parts of the rim and in consequence of the substantially inextensible body 4, the gasket is compressed and exerts pressure against the surfaces of the rim parts to establish a perfect air tightness, as shown in Figure 4.

Moreover, the above specified gasket can usefully be provided with a number of transverse projections, indicated by the numeral 5 in Figure 5, preferably disposed at regular spaces on the peripheral surface of the rim, each of such projections having a total extension in a transverse sense slightly less or at the most equal to the distance between the inner bead surfaces of a tire received on the rim, without, however, exerting a pressure on the inner bead surfaces.

Under irregular conditions, as in the case of tire deflation during the running of the vehicle, the beads, which would otherwise tend to approach to each other, come into contact with the above specified transverse projections which then act as struts between the said beads, keeping the tire in correct position on the rim.

The projections which are integrally fixed on the gasket must be conveniently made in order to fulfill their spacing function between the beads in case of emergency, said projections being preferably constituted of a rubber compound of sufficient stiffness or opportunely reinforced, for instance, by metallic or natural, artificial, or synthetic textile threads, cords or fabrics in order to obtain the required stiffness. The number of said projections may vary, being preferable that their distribution upon the rim be kept uniform, that is that they be at constant angular distances. The Figure 6 shows diagrammatically and perspectively the reinforced gasket provided with the transverse projections.

It is understood that although the above projections shown in Figure 6, are three in number and are disposed at an angular distance of 120°, the projections may be in any number whatever. It is preferred that their disposition about the gasket be such that the projections are equally spaced apart.

By the term "rubber compound" as used herein is meant to indicate both natural and/or synthetic rubber compounds and plastic materials.

Although the present invention has been shown and described with reference to specific embodiments, nevertheless, various changes and modifications obvious to one skilled in the art are within the spirit and scope of the invention.

What is claimed is:

1. A divided rim assembly adapted for use with a tubeless tire comprising a two-piece divided rim having the two pieces connected together and an annular reinforced gasket comprised of an elastic part and a substantially inextensible part, the inner diameter of said gasket being less than the diameter of the rim parts at their connection, and the outer diameter of said gasket being greater than the diameter of the rim parts at their connection so that a portion of the gasket lies radially outside the rim parts at their connection, said portion including said substantially inextensible part of said gasket, and a portion of said elastic part being compressed between the two pieces of said divided rim at the interstice defined by the connection of the two pieces.

2. An assembly as defined in claim 1 wherein said substantially inextensible part is arranged externally of said elastic part of said gasket.

3. An assembly as defined in claim 1 wherein said substantially inextensible part is imbedded within said elastic part of said gasket.

4. An assembly as defined in claim 1 wherein said substantially inextensible part is composed of a metallic material.

5. An assembly as defined in claim 1 wherein said substantially inextensible part is composed of a textile material.

6. An assembly as defined in claim 1 wherein said annular reinforced gasket is further provided with a plurality of transverse projections arranged about the periphery of said gasket.

7. An assembly as defined in claim 6 wherein said plurality of transverse projections are equally spaced about said annular reinforced gasket and extend at both sides of said gasket a distance not greater than the distance between the inner bead surfaces of a tire when positioned on the rim.

8. An assembly as defined in claim 6 wherein each said transverse projection is constituted of a rubber compound reinforced with means composed of a substantially inextensible material.

9. Annular reinforced gasket as in claim 1, characterized in that the elastic part is constituted of an annular body having circular cross section.

10. Annular reinforced gasket as in claim 9 characterized in that the part of scarcely extensible material is arranged within the elastic part of said gasket.

11. Annular reinforced gasket as in claim 1, characterized in that the elastic part is constituted of an annular body, the cross section of which has a polygonal shape.

12. Annular reinforced gasket as in claim 11 characterized in that the part of scarcely extensible material is constituted of textile material, previously rubberized.

13. Annular reinforced gasket as in claim 11, characterized in that the part of scarcely extensible material is arranged externally to the elastic part of said gasket.

14. Annular reinforced gasket as in claim 13 characterized in that the part of scarcely extensible material is constituted of a metallic material.

15. Annular reinforced gasket as in claim 14 characterized in that it is provided with transverse projections disposed preferably at regular intervals on the rim surface upon which the tire is supported, each of the above projections extending at both sides of the gasket and having a total transverse width, at most equal to the distance between the inner bead surfaces of the assembled and inflated tire.

16. Annular reinforced gasket as in claim 15, characterized in that the transverse projections are constituted of a rubber compound, reinforced with textile material.

17. Annular reinforced gasket as in claim 15 characterized in that the transverse projections are constituted of a rubber compound, reinforced with metallic material.

References Cited in the file of this patent

UNITED STATES PATENTS

| | | |
|---|---|---|
| 1,132,898 | Austin | Mar. 23, 1915 |
| 2,697,252 | Clark | Dec. 21, 1954 |
| 2,790,476 | Herzegh | Apr. 30, 1957 |